United States Patent [19]
Lompa

[11] Patent Number: 5,626,087
[45] Date of Patent: May 6, 1997

[54] MOBILE SMOKELESS AGRICULTURAL FIELD BURNER

[75] Inventor: Tye E. Lompa, Hollister, Calif.

[73] Assignee: Unverferth Manufacturing Company, Inc., Kalida, Ohio

[21] Appl. No.: 280,777

[22] Filed: Jul. 26, 1994

[51] Int. Cl.⁶ ........................................ F23B 1/28
[52] U.S. Cl. .................. 110/196; 110/239; 110/240; 47/1.42; 47/1.44; 126/271.2 C
[58] Field of Search ........................ 110/196, 239, 110/240, 241; 15/4, 84; 126/271.2 C, 271.3; 47/1.42, 1.43, 1.44

[56] References Cited

U.S. PATENT DOCUMENTS

| | | | |
|---|---|---|---|
| 3,785,303 | 1/1974 | Hopkins | 110/240 |
| 3,802,020 | 4/1974 | Stone | 15/4 |
| 3,809,060 | 5/1974 | Shirley et al. | 126/271.2 C |
| 4,088,122 | 5/1978 | Miles | 126/271.2 C |
| 4,688,494 | 8/1987 | Domnitch | 110/240 |

*Primary Examiner*—Henry A. Bennett
*Assistant Examiner*—Susanne C. Tinker
*Attorney, Agent, or Firm*—Rothwell, Figg, Ernst & Kurz

[57] ABSTRACT

A smokeless mobile agricultural field burner for burning agricultural waste products, mainly rice straw, in the field without releasing excessive air pollution into the environment. The burner consists of a main structure, either self-propelled or towed, that serves as a burn chamber. The sides, top and rear of the main structure are enclosed, while the front and bottom are open, allowing fire to come into contact with the ground to provide sterilization benefits to the soil thereby helping to control soil contamination. Destruction of the waste products is facilitated by a series of primary burners in the burn chamber. Smoke, debris and ash resulting from the primary burn are channeled through the interior of the burner into exhaust ducts by air currents generated by a blower mounted on the outside of the main structure. Once in the exhaust ducts the smoke and debris is destroyed by a set of afterburners, then allowed to escape to an exhaust chamber. In the exhaust chamber, the ash is allowed to drop to the bottom of the chamber and is tilled into the soil, while the hot air rises to the top of the chamber and is released into the environment through a series of air filters.

15 Claims, 5 Drawing Sheets

MOBILE SMOKELESS AGRICULTURAL FIELD BURNER

BACKGROUND—FIELD OF INVENTION

This invention relates to the burning of agricultural waste products, mainly rice straw, in the field without causing excessive air polution.

BACKGROUND—DESCRIPTION OF PRIOR ART

For years, in the rice farming industry it has been common practice to burn the fields after harvest to rid the field of stubble (the part of the rice plant left behind by the harvester) which can reach heights of twelve centimeters to one meter. The burning of the field not only removes this waste product, it also serves the important purpose of sterilizing and decontaminating the soil. This process is vital to the succesful cultivation of rice because of a fungus that is common in rice fields which, if left to winter over in the field, will prove detrimental to the following year's crop. The only way known at this time to control this harmful soil fungus is by burning the fields after harvest. Unfortunately, the current practice of setting the fields on fire has come under scrutiny by environmental groups because of the air pollution it causes. Legislation has been passed providing for the mandatory faze out of all such practice by the year 2000. Obviously, this legislation has created a great need for an alternative method of disposing of rice stubble. Alternative methods that have been attempted include pulverizing, shredding, baling, disking and flooding the stubble. All of these methods have proven unacceptable to farmers, in part because of economic unfeasiblity and incomplete removal of the stubble, and mainly because they fail to rid the soil of the above mentioned fungus. My invention facilitates both the complete removal of rice stubble as well as the destruction of harmful fungus, without releasing excessive polution into the environment. The mobile field burner discussed in U.S. Pat. No. 3,802,020 to Stone and Coakley, April 1974 provides for the destruction of loose grass particles in the field as well as sterilization of the soil using hot gases. This burner, however, can not be used to burn rice stubble, because it requires the material to be burnt to be conveyed into a hopper where it is incinerated. Because the major portion of the rice stubble is left attatched to the ground, this conveyer method would prove useless because it does not provide any means for destroying vegetation left attatched to the ground. My invention burns both loose rice straw as well as stubble still attatched to the ground by means of a burn chamber located in direct contact with the ground. Another problem with the previously mentioned field burner is that it does not sufficienly clean the waste products from the exhaust gases before releasing them into the environment. Twenty years ago, when this pattent was filed, the inventor was mainly concerned with the removal of large particles such as ash and debris from the smoke before releasing it into the air. Today, as our air pollution standards have become much more stringent, we must concern ourselves not only with the removal of the above mentioned large particles, but with the elimination of the smoke itself. My invention provides for the elimination of this smoke by means of an afterburner in the exhaust chamber of the burner that destroys the smoke before releasing the exhaust gases into the surrounding air. There are a number of smokeless burners on the market today that employ this principal of burning the smoke before releasing it, but as of yet all of these burners are stationary and, thus impractical for the field burning application.

OBJECTS AND ADVANTAGES

In addition to the ones listed above, several objects and advantages of my present invention are:

(a) to provide a mobile smokeless burner that is capable of burning agricultural waste products in the field efficiently and economically;

(b) to provide a mobile smokeless burner that is capable of burning the above mentioned waste products without violating current environmental standards;

(c) to provide a mobile smokeless burner which can either be self propelled or towed by another vehicle through the field;

(d) to provide a mobile smokeless burner that is capable of bringing fire in contact with the ground to sterilize the soil;

(e) to provide a mobile smokeless burner that is capable of bringing fire in contact with the ground without allowing the fire to escape to surrounding areas;

(f) to provide a mobile smokeless burner that is capable of burning loose agricultural waste products as well as vegetation that is still connected to the ground;

(g) to provide a mobile smokeless burner that uses fuel efficiently;

(h) to provide a mobile smokeless burner with removable or retractable wheels so that it may be transported to various burn sites easily and legally on rural roads as well as highways and interstates;

The main objects and advantages of my invention are to provide a mobile agricultural waste burner that is capable of burning agricultural waste, mainly rice straw, in the field without releasing excessive air pollution into the environment. The burner will provide a safe, environmentally friendly, economically leasable means of disposing of unwanted waste products as well as providing sterilization benefits to the underlying soil, thus removing any contaminates that may be harboured there. Further objects and advantages of my invention will become apparent from a consideration of the ensuing drawings and description.

DRAWING FIGURES

REFERENCE NUMERALS IN DRAWINGS

| | |
|---|---|
| 10 air blower | 12 fuel tank |
| 14 primary fuel hose | 16 afterburner fuel hoses |
| 18 air duct | 20 air manifold |
| 22 air manifold | 24 air manifold |
| 26 afterburners | 28 exhaust ducts |
| 30 primary burner manifold | 32 hitch |
| 34 hydraulic cylinder | 36 tires |
| 38 axle | 40 burner structure |
| 42 primary burners | 44 air holes |
| 46 skids | 48 hinge |
| 50 adjustable flap | 52 hinge |

| | |
|---|---|
| 54 adjustable flap | 56 exhaust chamber |
| 58 burn chamber | 60 fuel valve & regulator |
| 62 coil shanks | 64 tillage equipment bar |
| 66 air filters | |

DESCRIPTION—FIGS. 1 TO 5

Figure 1:
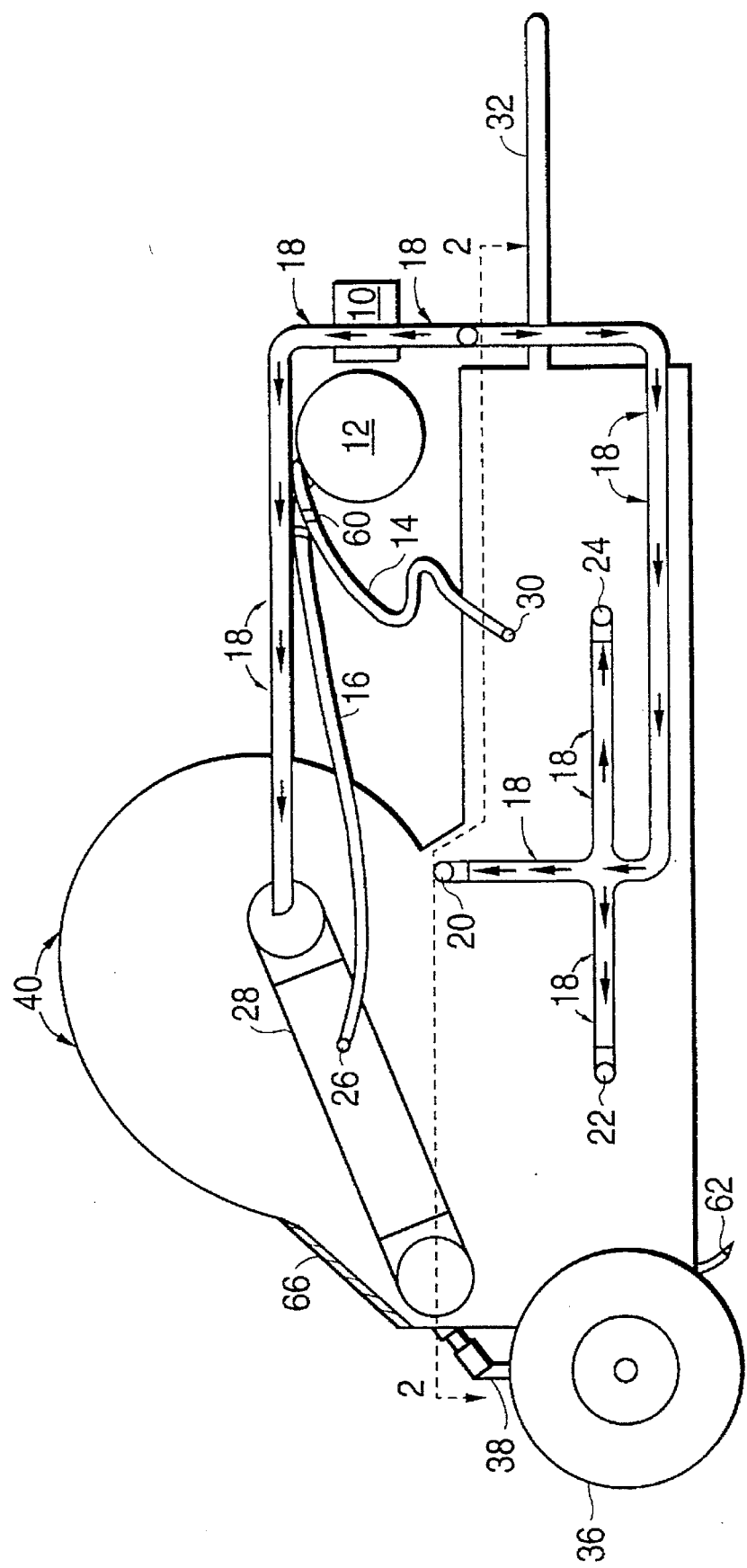
FIG. 1 is a side view of the outside of my invention.
Figure 4:
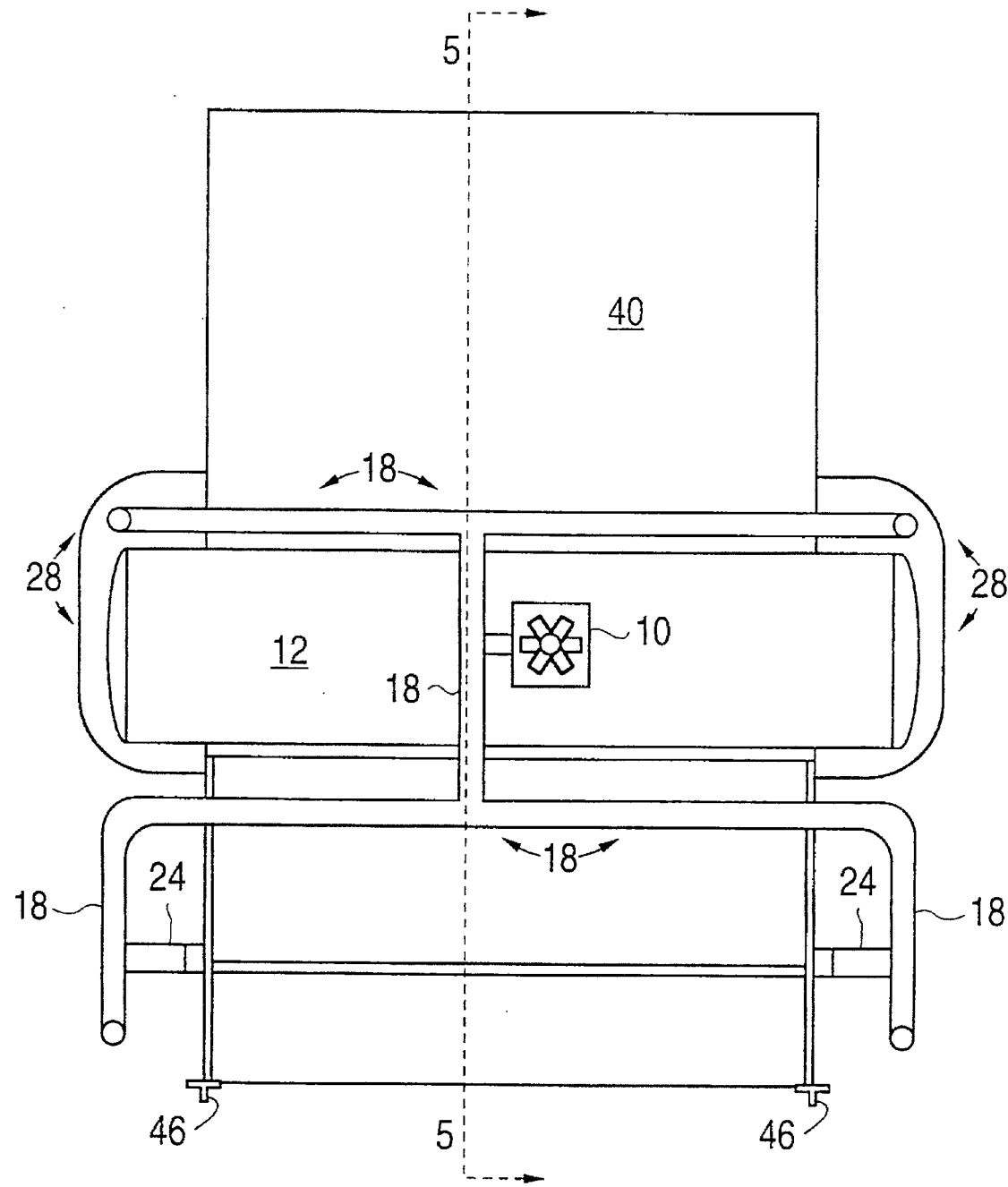
FIG. 4 is a view of the front of my invention.
Figure 5:
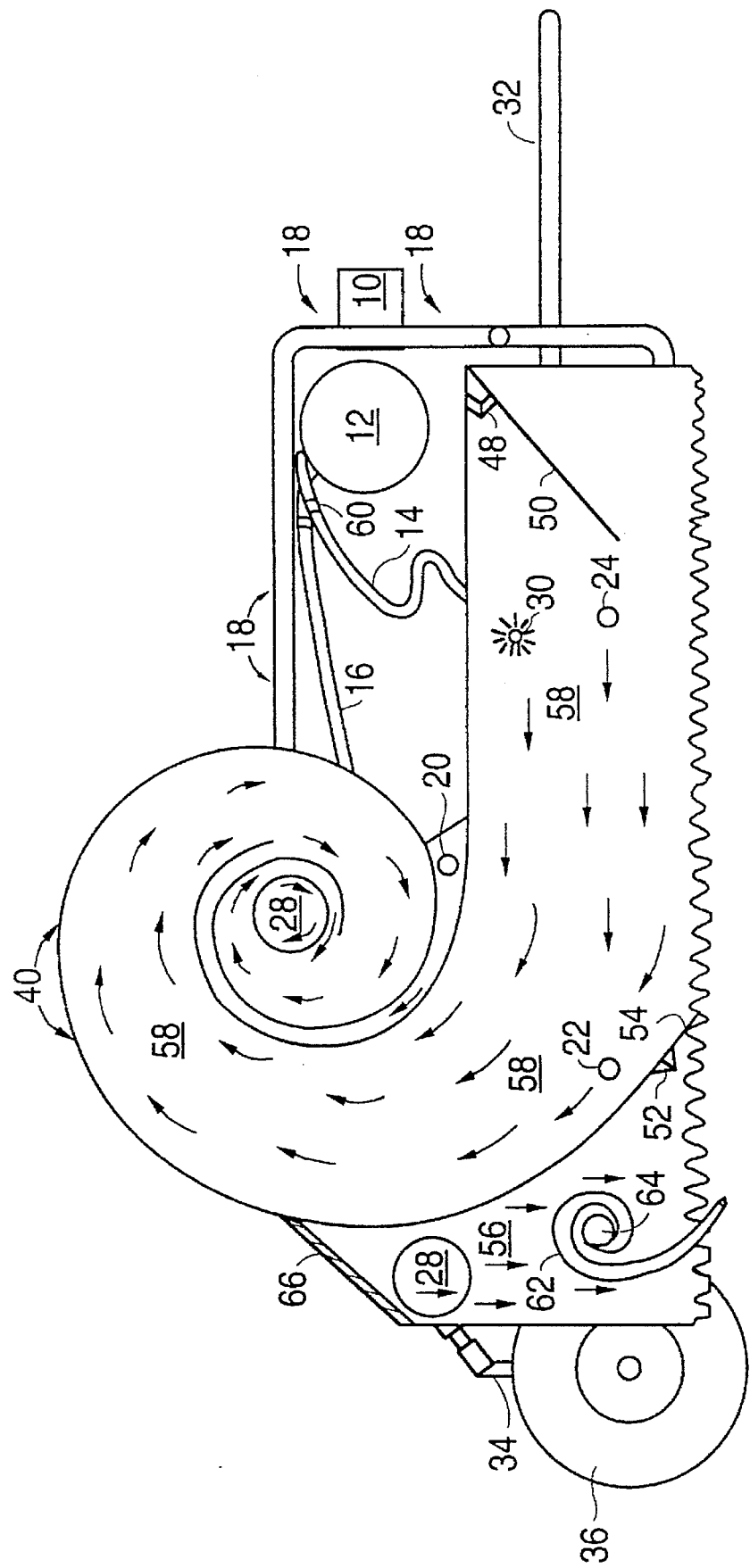
FIG. 5 is a view of the portion of my invention indicated by the section lines 5—5 in FIG. 4 looking from the left hand side of the invention.

FIG. 1 shows a side view of a basic embodiment of my mobile smokeless agricultural field burner. The burner consists of a main structure 40 fabricated from heat tolerant steel. Main structure 40 consists of two sides, a back and a top, the bottom of main structure 40 is open, as is the front. The form of main structure 40 is best shown in FIG. 5. Tires 36 are mounted to main structure 40 by means of an axle 38 and hydraulic cylinder 34. Tires 36 are mounted in such a way that they may be easily removed for field application of the burner or put in place for moving the burner from place to place. A hitch 32 is mounted to the front sides of the main structure 40. Hitch 32 is of such design that it may be used either in the field application of the burner or for transporting the burner from place to place. Skids 46 are located along the bottom of the main structure, shown in FIG. 4.

Figure 2:
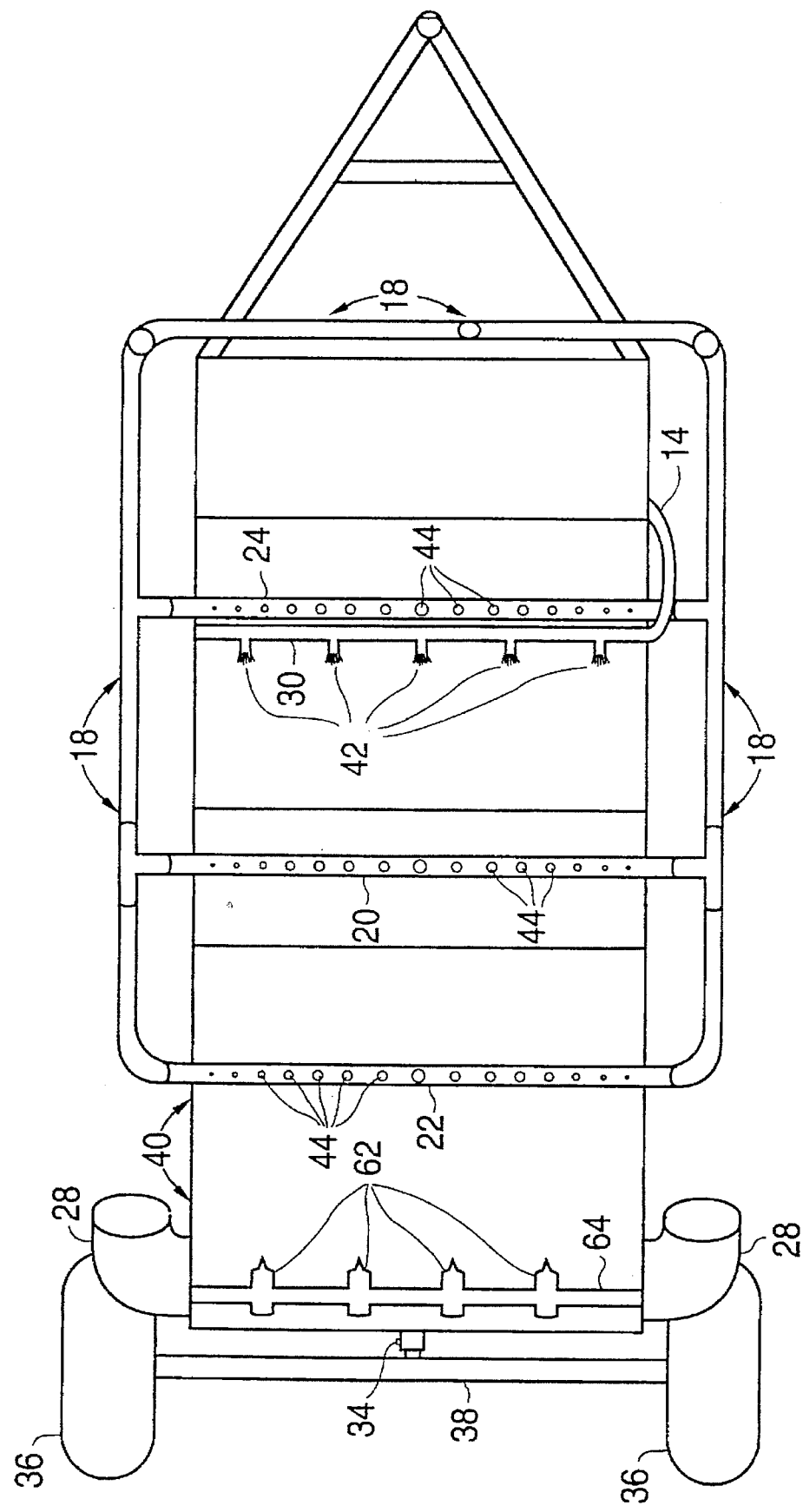
FIG. 2 is a view of the portion of my invention indicated by the section lines 2—2 in FIG. 1 looking from the top down.
Figure 3:
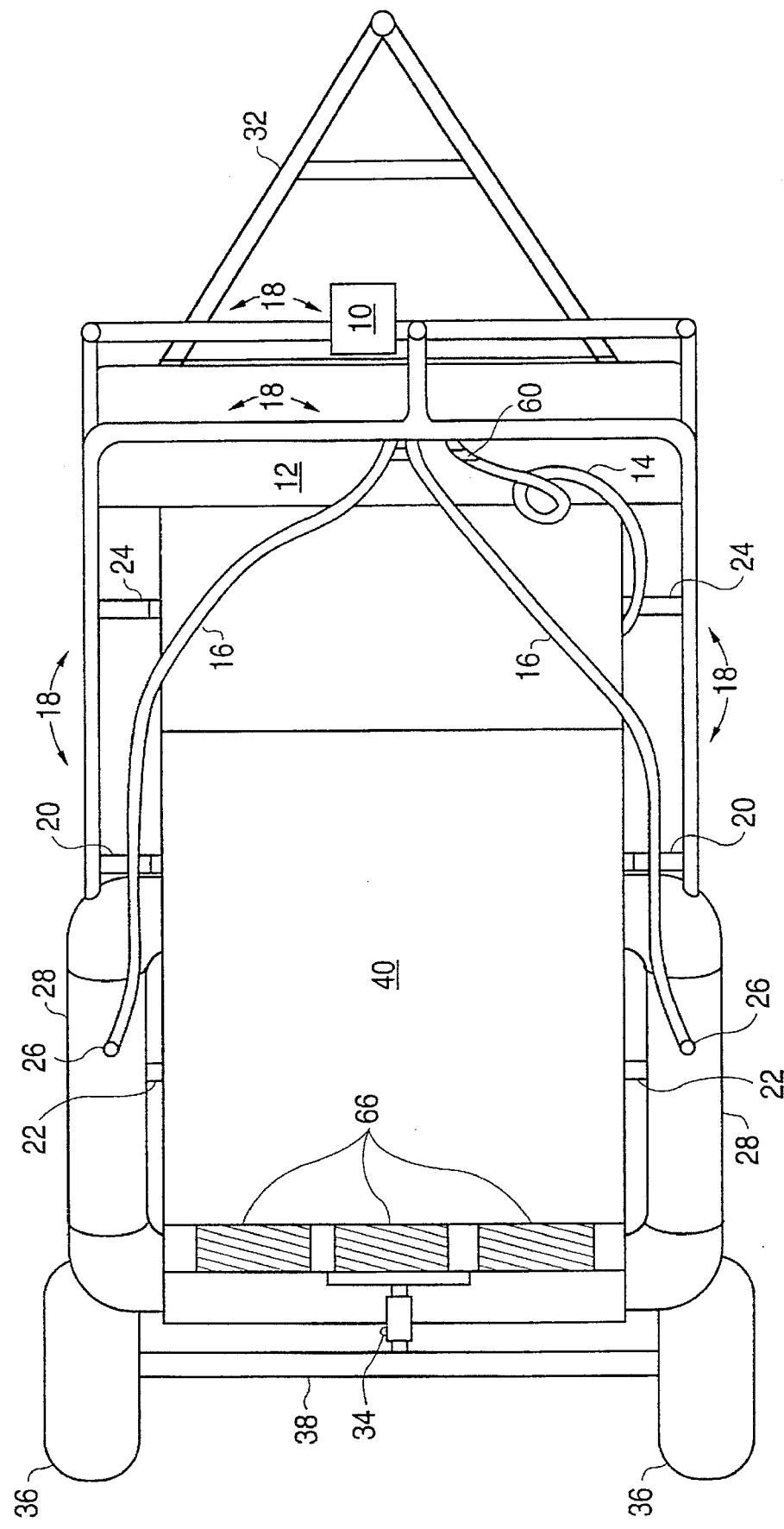
FIG. 3 is a top view of the outside of my invention.

A blower 10 is mounted to the front of the main structure. Blower 10 is best shown in FIG. 4. An air duct 18 is connected to blower 10 to transport air to three air manifolds 20, 22, and 24 and to two exhaust ducts 28. Air manifolds 20, 22, and 24 are mounted through the sides of main structure 40 to extend all the way through the structure, as indicated in FIG. 2. Exhaust ducts 28 are mounted to the outside of main structure 40, as indicated by FIG. 3. The structure of air manifolds 20, 22, and 24 is best shown in FIG. 2. Each manifold has air holes 44 to direct the flow of air inside a burn chamber 58. The direction of air flow generated by manifolds 20, 22, and 24 is best indicated by arrows in FIG. 5. Air directed into exhaust ducts 28 is directed towards an exhaust chamber 56 shown in FIG. 5. Coil shanks 62, or some other form of tillage equipment is mounted to the bottom of exhaust chamber 56 by means of a bar 64 that extends from one side of main structure 40 to the other. Air filters 66 are located at the top of exhaust chamber 56. Any type of flat heat resistant air filter may be used.

A fuel tank 12, shown best in FIG. 4 is mounted on the front of main structure 40. A primary fuel hose 14 runs from fuel tank 12 to a burner manifold 30. Fuel flow through hose 14 to manifold 30 is controlled by means of a valve and regulator 60 located near fuel tank 12. Fuel is transported inside burner manifold 30 to multiple primary burners 42 located along manifold 30, shown best in FIG. 2. Primary burners 42 have self contained pilot lights. An afterburner fuel hose 16 runs from fuel tank 12 to afterburners 26 located inside exhaust ducts 28, this is best illustrated in FIG. 3. Afterburners 26 have self contained pilot lights. Fuel flow in afterburner fuel hose 16 is controlled by means of a valve and regulator 60 located near fuel tank 12.

Main structure 40 has two movable parts shown in FIG. 5. An adjustable flap 50 near the front of the burner, which is controlled by a hinge 48. Another movable part is an ajustable flap 54 seperating burn chamber 58 from exhaust chamber 56, controlled by a hinge 52. Both flaps 50 and 54 may be adjusted to adapt the burner to various soil conditions and materials to be burnt.

OPERATION—FIGS. 1 TO 5

The prefered embodiment of my mobile smokeless agricultual field burner is propelled through the field by an outside source, such as a tractor, hooked to a hitch 32. An alternative method would be to convert the burner to a self-propelled unit by adding an engine and running gear. The prefered embodiment of my burner is towed through the field on skids 46 mounted to the bottom of the burner. Skids 46 are tee shaped to allow the burner make a seal with the soil without letting it sink deep into the ground. As the burner transverses the field a blower 10 forces air into an air duct 18. The air is transported through duct 18 to three seperate air manifolds 20, 22, and 24. Air is blown out through manifolds 20, 22, and 24 through a series of holes 44. The air currents generated by the manifolds direct debris, smoke and ash through a burn chamber 58 and into two exhaust ducts 28. Once in exhaust ducts 28 the debris, smoke, and ash is further directed through to an exhaust chamber 56 by another air current introduced to exhaust duct 28 by air duct 18.

Agricultural waste products are destroyed by my burner as it is towed over the top of them. The first part of the burner to pass over the waste products is an adjustable flap 50 which is controlled by a hinge 48. Flap 50 is adjusted according to the size of materials to be burnt. As the material slips past flap 50 it is positioned in a burn chamber 58 which is in direct contact with the ground. A series of primary burners 42 is passed over the waste products, and as the waste is burnt, the ground below is also scorched. Primary burners 42 are fueled by a hose 14 connected to fuel tank 12. The fuel supply to primary burners 42 is controlled by valve and regulator 60 located near fuel tank 12. Air manifold 24 is located in front of primary burners 42 to direct by-products of burnt materials (debris, ash and smoke) toward the rear of burn chamber 58. Loose debris continues to burn as it is directed through burn chamber 58 by air manifold 22. Debris, ash, and smoke are directed through burn chamber 58 and into exhaust duct 28 by a combination of main structure 40 and air currents generated by air manifolds 22 and 20. Once in exhaust duct 28 the waste products are forced by an afterburner 26 by air currents blown into the head of exhaust duct 28 by air duct 18. Afterburners 26 are fueled by hoses 16 connected to fuel tank 12. The fuel supply to afterburners 26 is controlled by valve and regulator 60, located near fuel tank 12. As the waste products are passed by afterburner 26, any debris and smoke is destroyed. Remaining pieces of ash and hot air is channeled through exhaust duct 28 and into exhaust chamber 56. In exhaust chamber 56, peices of ash are allowed to fall to the ground where they are turned into the soil by a series of coil shanks 62 mounted on bar 64. Hot air is allowed to rise to the top of exhaust chamber 56 and pass through air filters 66 and into the surrounding environment.

The burner can be transported from place to place or pulled through rough terrain raising and lowering tires 36. Tires 36 can be easily raised and lowered using a hydraulic cylinder 34 mounted to axel 38.

SUMMARY, RAMIFICATIONS, AND SCOPE

Thus the reader will see that my mobile smokeless agricultural field burner will provide a safe, environmentally friendly, and economically feasable means of disposing of unwanted waste products in the field. My burner provides, as well, for sterilization benefits of the ground to help control soil contamination. My burner can be easily transported from place to place and used for a variety of applications.

While my above description contains many specificities, these should not be conscrued as limitations on the scope of my invention, but rather as an example of my presently preferred embodiment thereof. Many other variations are possible. For example, various parts could be constructed of other types of materials that would serve the same purpose; other means of transporting the burner could be employed; various parts could take on different physical forms, etc.

Thus the scope of my invention should be determined by the appended claims and their legal equivilants, rather than by the examples given.

I claim:

1. A mobile smokeless agricultural field burner for burning waste products in a field of soil and decontaminating the soil of said field while eliminating excess pollution release into an environment outside said field, comprising:

(a) a burn chamber oriented in direct contact with the soil of said field comprising a combustion means for burning said waste products and decontaminating the soil of said field, wherein said burning forms by-products from said waste products;

(b) an exhaust chamber separate from said burn chamber and located rearwardly of said burn chamber on said field burner, said exhaust chamber comprising a filtering means for filtering exhaust gases before their release into the environment and a tillage means for turning remaining by-products, including debris and ash, into the soil;

(c) an exhaust duct for carrying said by-products from said burn chamber to said exhaust chamber, said exhaust duct containing a combustion means for further burning said by-products;

(d) a system for generating air currents within the mobile burner to direct said by-products of said waste products from said burn chamber, through said exhaust duct and into said exhaust chamber;

(e) transportation means for moving the mobile burner from place to place when not in use; and (f) shielding means for preventing flames inside said burn chamber from escaping to an area outside the mobile burner.

2. The mobile burner of claim 1 further including a hitching means for attatching the burner to an outside power source to allow the burner to be towed through said field.

3. The mobile burner of claim 1 further including a means for propelling the burner through said field on its own power.

4. The mobile burner of claim 1 wherein a blower used to force air into said burn chamber creating said air currents.

5. The mobile burner of claim 1 wherein a fuel source is mounted on the outside of the mobile burner.

6. The mobile burner of claim 5 wherein fuel is transported from said fuel source to said combustion means by hoses and controlled by valves and regulators.

7. The mobile burner of claim 6 wherein said combustion means comprise propane burners fueled by liquid and gas propane.

8. The mobile burner of claim 1 wherein said burn chamber is constructed of heat resistant steel.

9. The mobile burner of claim 1 wherein said tillage means inside said exhaust chamber comprise a series of coil shanks.

10. The mobile burner of claim 1 wherein said transportation means comprise a set of tires with a means for raising and lowering said tires.

11. The mobile burner of claim 1 wherein said shielding means comprise a set of tee shaped skids mounted to the bottom of said burn chamber.

12. The mobile burner of claim 1 wherein said system for generating air currents comprises an air blower, a plurality of air manifolds within said burn chamber for forcing air into said burn chamber, each said air manifold having a plurality of air outlet holes into said burn chamber, an air duct connecting said air blower with said air manifolds for carrying air from said air blower to said air manifolds, and means connecting said air duct with said exhaust duct for directing air from said air blower into said exhaust duct and toward said exhaust chamber.

13. The mobile burner of claim 12 wherein said combustion means for burning said waste products includes a fuel tank, a burner manifold within said burn chamber, said burner manifold having a plurality of burners for burning said fuel within said burn chamber, and a fuel hose connecting said fuel tank with said burner manifold for carrying fuel from said fuel tank to said burner manifold.

14. The mobile burner of claim 13 wherein said combustion means for burning said by-products includes an afterburner within said exhaust duct, and means connecting said afterburner with said fuel tank.

15. The mobile burner of claim 14, including one said exhaust duct on one side of said mobile burner, and another said exhaust duct on an opposite side of said mobile burner, each said exhaust duct including a corresponding afterburner connected with said fuel tank.

* * * * *